(12) United States Patent
Sakai

(10) Patent No.: US 8,320,680 B2
(45) Date of Patent: Nov. 27, 2012

(54) IMAGE PROCESSING APPARATUS, IMAGE PROCESSING METHOD, COMPUTER PROGRAM, AND STORAGE MEDIUM

(75) Inventor: Hiroyuki Sakai, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 12/484,628

(22) Filed: Jun. 15, 2009

(65) Prior Publication Data

US 2009/0317001 A1    Dec. 24, 2009

(30) Foreign Application Priority Data

Jun. 20, 2008  (JP) ................. 2008-162301

(51) Int. Cl.
*G06K 9/62* (2006.01)
*G06K 9/68* (2006.01)
(52) U.S. Cl. .................. 382/209; 382/218
(58) Field of Classification Search .......... 382/209, 382/218
See application file for complete search history.

(56) References Cited

U.S. PATENT DOCUMENTS

| 6,993,184 | B2 * | 1/2006 | Matsugu ............. 382/173 |
| 7,613,332 | B2 * | 11/2009 | Enomoto et al. .......... 382/115 |
| 8,005,271 | B2 * | 8/2011 | Kawada ............. 382/118 |
| 8,035,687 | B2 * | 10/2011 | Nishiyama ............. 348/169 |
| 2005/0207649 | A1 | 9/2005 | Enomoto |
| 2010/0226533 | A1 * | 9/2010 | Bharath et al. ......... 382/103 |

FOREIGN PATENT DOCUMENTS

| JP | 2004-207987 A | 7/2004 |
| JP | 2005-267512 A | 9/2005 |
| JP | 2006-338329 A | 12/2006 |
| JP | 2008-141617 A | 6/2008 |

* cited by examiner

*Primary Examiner* — Daniel Mariam
(74) *Attorney, Agent, or Firm* — Canon USA Inc IP Division

(57) ABSTRACT

Image data and image-capturing-condition information obtained by analyzing the image data are input from an external apparatus. Based on the input image-capturing-condition information, a range of angles or sizes employed in a process of detecting a specific area from the image data is determined. The specific area is detected based on the determined range of angles or sizes.

13 Claims, 7 Drawing Sheets

# IMAGE PROCESSING APPARATUS, IMAGE PROCESSING METHOD, COMPUTER PROGRAM, AND STORAGE MEDIUM

BACKGROUND OF THE INVENTION

1. Field of the Invention

The present invention relates to an image processing apparatus, an image processing method, a computer program, and a storage medium, adapted for use in a situation in which a similar detection process is performed in both an image capturing apparatus and an image processing apparatus, and configured to detect a specific area based on information detected in a detection process performed by the image capturing apparatus.

2. Description of the Related Art

In recent years, many image capturing apparatuses such as digital cameras or digital video cameras have become available which have a capability of detecting a subject such as a face or a total figure of a person in adjustment of an image capturing condition such as a focal length for the subject or an exposure condition, and many printing apparatuses such as a printer have become available which have a capability of performing similar processing to that performed by the image capturing apparatus to detect a subject such as a face or a person included in an input image thereby allowing a correction process to be performed depending on the subject.

For example, Japanese Patent Laid-Open No. 2004-207987 discloses a printing apparatus configured to correct an image based on image-capturing-condition information representing an image capturing condition employed by a digital camera. In the image processing method disclosed in Japanese Patent Laid-Open No. 2004-207987, image data of an image of a subject captured by a digital camera and person coordinate information indicating the location and the size of a person image relative to the total image are stored in a memory card. In a printer, the image data and the person coordinate information are read from the memory card. Based on the person coordinate information read from the memory card, the person data is corrected by performing enlargement, reduction, and/or replacement such that the image of the person has a desired size and position in a specified total image area, and printing is performed according to the corrected data.

Japanese Patent Laid-Open No. 2005-267512 discloses a method in which, in a red-eye detection process, an area, a direction, and a size in a face detection process are limited thereby achieving an increase in red-eye detection speed. In this method disclosed in Japanese Patent Laid-Open No. 2005-267512, a red eye candidate area is set as a specific area candidate, and a face detection is performed in the specific area candidate. If a face is detected, information indicating a face direction and a face size is stored as face information. When a face detection process is performed for a next specific area candidate, the direction and the size in the face detection are limited based on the stored face information. The limitation on the direction and the size in the face detection process makes it possible to perform the detection process in a short time, and leads to a reduction in probability of making an erroneous detection.

However, in the technique disclosed in Japanese Patent Laid-Open No. 2004-207987, the face detection process capability is not implemented in both a digital camera and a printer, but only in the digital camera. When an image of a subject of a person is captured by the digital camera, there is a possibility that movement of the subject occurs after the subject is detected and the focal length is adjusted. This can cause a difference to occur between the coordinate position of the subject in actually captured image data and the detected coordinate position indicated by the person coordinate information. In the case where there is a difference between the coordinate position indicated by the person coordinate information and the coordinate position in the actually captured image data, if the printer uses the person coordinate information produced by the digital camera, then a position error occurs also in corrected image data.

In the image processing method disclosed in Japanese Patent Laid-Open No. 2005-267512, the direction and the size in the face detection performed by the detection apparatus are limited based on the stored face information. However, the face detection capability is not implemented in both the digital camera and the printer. Therefore, in the technique disclosed in Japanese Patent Laid-Open No. 2005-267512, the printer is not capable of detecting the face area using the face information produced in the face detection process performed by the image capturing apparatus.

In view of the above, the present invention provides a technique to, in a case where a capability of detecting a specific area is implemented in both an external apparatus and an image processing apparatus, perform a specific area detection process in the image processing apparatus based on information detected in a detection process performed by the external apparatus thereby achieving a reduction in processing time and an increase in performance of the image processing apparatus.

SUMMARY OF THE INVENTION

To solve the above-described problems with the conventional techniques, the present invention provides an image processing apparatus including an input unit configured to input, from an external apparatus, image data and image-capturing-condition information obtained by analyzing the image data, a determining unit configured to determine an angle or a size of a template used in detecting a specific area from the image data, based on the image-capturing-condition information input via the input unit, and a detection unit configured to detect the specific area by comparing the image data with the template having the angle or the size determined by the determining unit.

In this image processing apparatus according to the present invention, in the situation in which the capability of detecting the specific area is implemented in both the external apparatus and the image processing apparatus, the image processing apparatus performs a specific area detection process based on information detected in the detection process performed by the external apparatus thereby achieving a reduction in processing time and an increase in performance of the image processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Image processing according to an embodiment of the present invention is described below with reference to accompanying drawings.

First Embodiment

Figure 8:
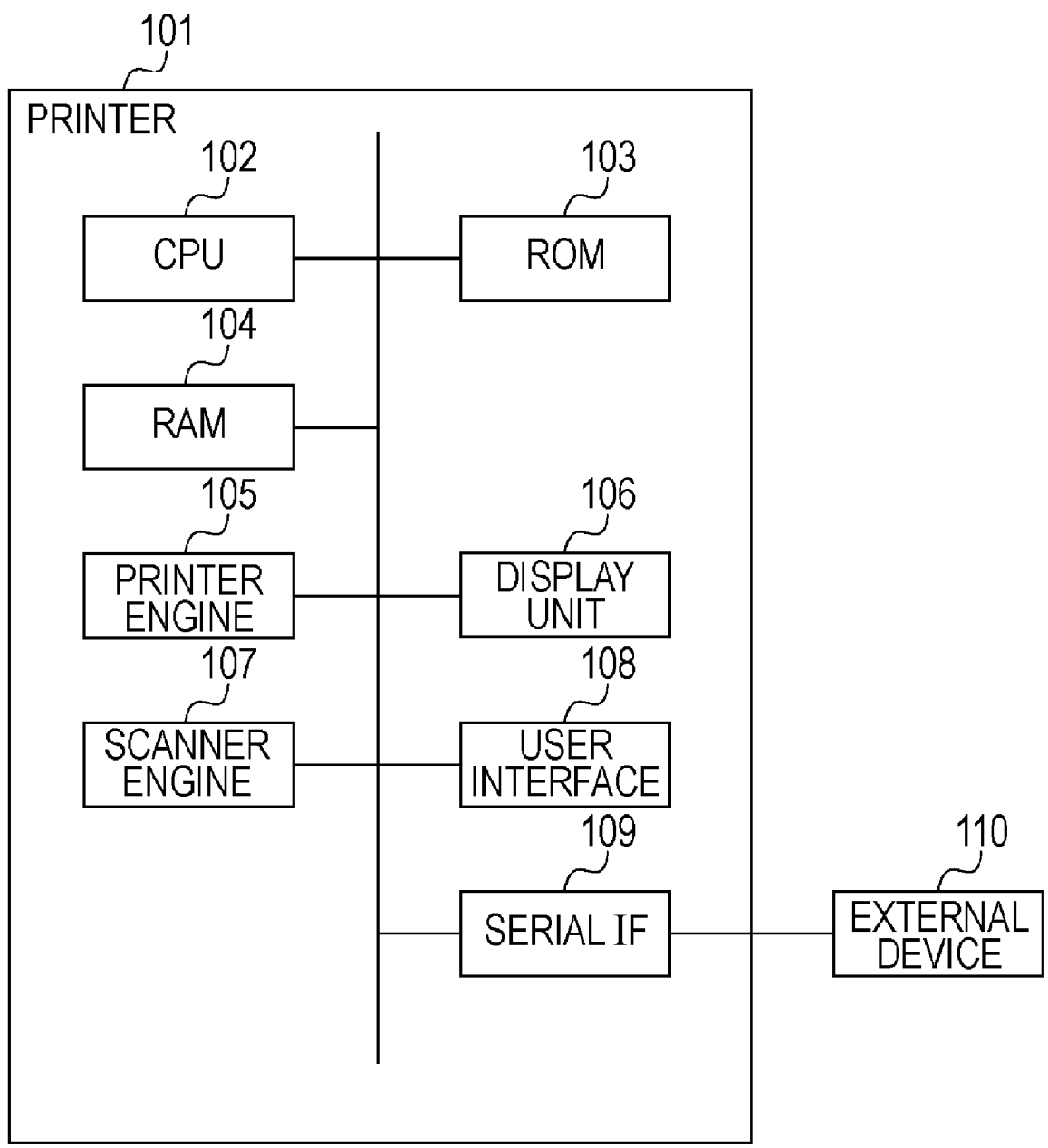
FIG. 8 is a block diagram illustrating an example of an internal hardware configuration of a printing apparatus according to an embodiment of the present invention.

FIG. 8 illustrates an example of a hardware configuration of a printer 101 serving as an image processing apparatus according to an embodiment of the present invention. The printer 101 includes therein a CPU 102, a ROM 103, a RAM 104, and a printer engine 105 for performing a printing process. In recent years, a multifunction peripheral having a printer function, scanner function, etc., has become commercially available. Thus, the image processing apparatus may additionally include a scanner engine 107 configured to scan a document. A display unit 106 is used to make setting in terms of various printing conditions such as a paper type, printing quality, etc. Reference numeral 108 denotes a user interface such as a button or a touch panel. Reference numeral 109 denotes an interface for a connection with an external apparatus such as a personal computer, a digital camera, etc. In the inside of the printer, the parts described above are connected to each other via a system bus.

Note that the printer may include other elements such as a power supply unit, a feeder for handling paper, an interface for a direct connection with a network, etc. However, these elements are not essential to the present invention, and thus a further explanation thereof is omitted.

Figure 9:
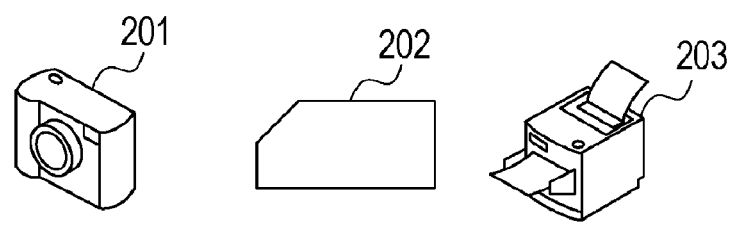
FIG. 9 is a diagram illustrating an example of a connection environment of a printing apparatus according to an embodiment of the present invention.
Figure 10:
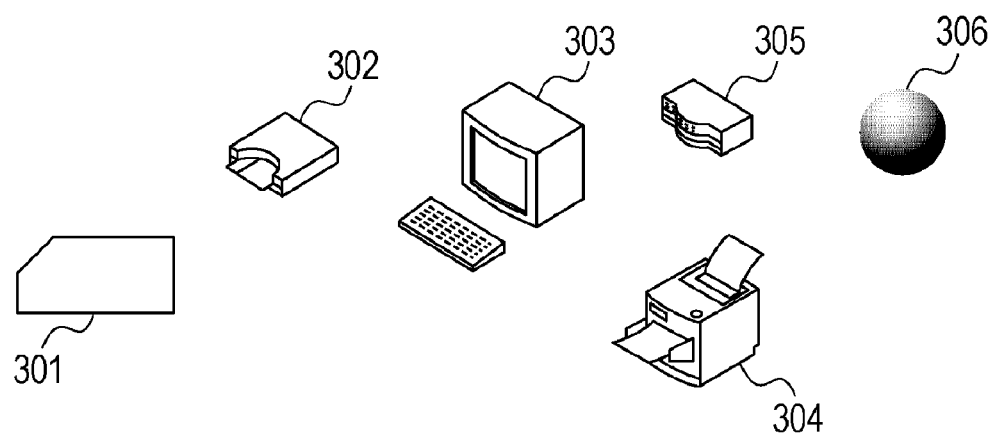
FIG. 10 is a diagram illustrating an example of a connection environment of a printing apparatus according to an embodiment of the present invention.

FIGS. 9 and 10 illustrate examples of printing environments to which the present embodiment of the invention is applicable. FIG. 9 illustrates an environment in which image data captured by a digital camera is printed. The image data captured by the digital camera 201 is stored in a memory card 202. The memory card 202 is connected to the printer 101 and the image data is printed by the printer 203. Instead of connecting the memory card 202 to the printer 203, the digital camera 201 may be directly connected to the printer 203 so that the image data can be directly transferred from the digital camera to the printer 203.

FIG. 10 illustrates an example of a printing environment including a personal computer serving as a main apparatus. The personal computer 303 has a hard disk for storing data acquired via various paths. Examples of the data stored on the hard disk include image data acquired from a memory card 301 via a card reader 302, image data downloaded from the Internet 306 via a router 305, etc. The data stored on the hard disk can be printed by a printer 304 by operating the personal computer 303.

In the present embodiment, as described above, image data produced by the image capturing apparatus 201 such as a digital camera is printed by the image processing apparatus 101 such as a printer.

In the following explanation, by way of example, it is assumed that the image capturing apparatus is a digital camera and the image processing apparatus is a printer. Note that the combination of apparatuses is not limited to this example, but various other combinations are allowed. For example, a combination of a scanner and a printer, a combination of a digital camera and a monitor (an image processing application), or a combination of a monitor (an image processing application) and a printer may be used.

Figure 1:
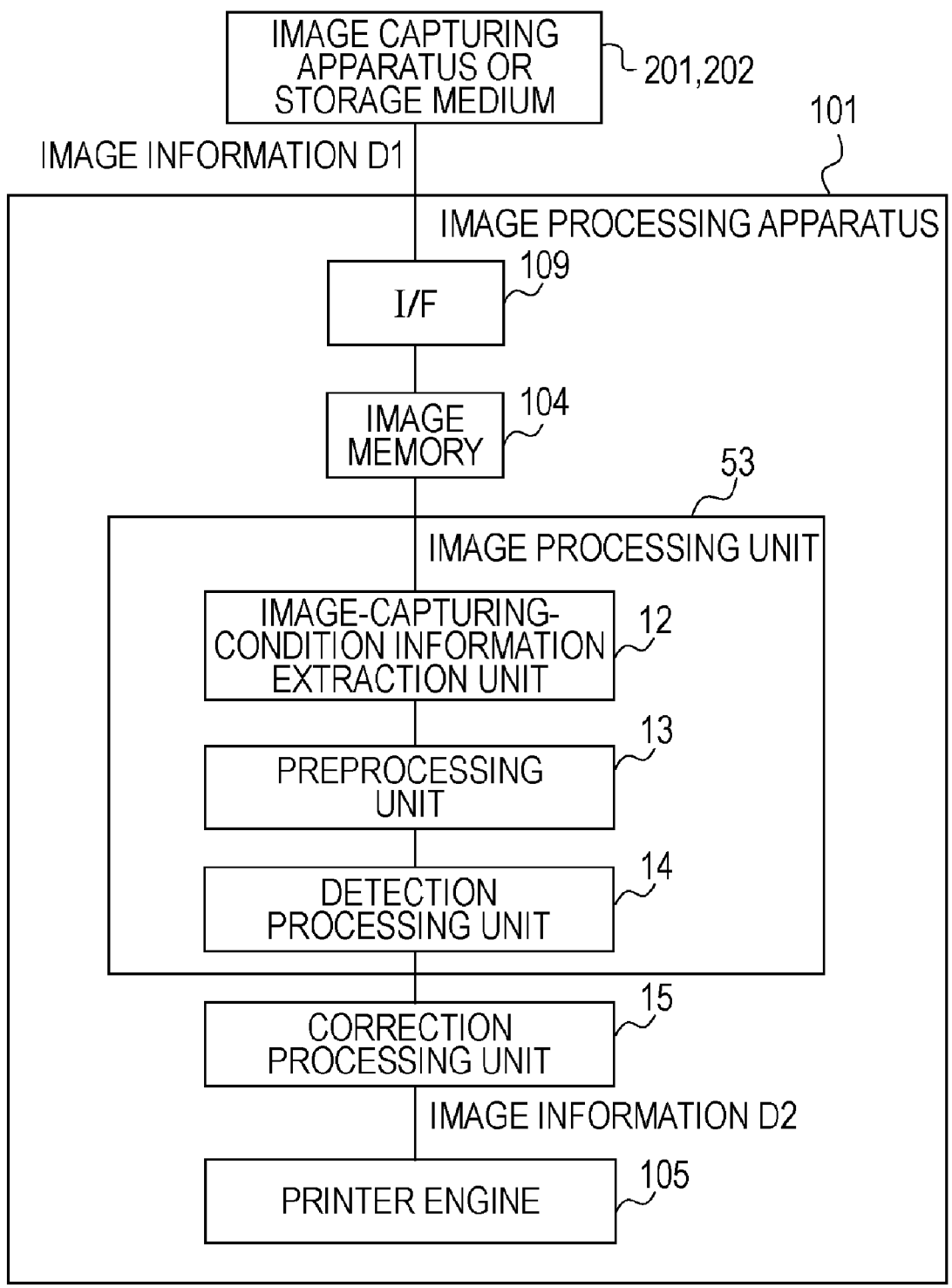
FIG. 1 is a schematic diagram illustrating an image processing apparatus including various processing units that operate according to an embodiment of the present invention.

The image processing method according to the present embodiment is executed using an image processing apparatus 101 shown in FIG. 1. FIG. 1 is a schematic diagram illustrating various processing units in the image processing apparatus 101 according to the embodiment of the present invention.

In FIG. 1, image information D1 including an image of a subject captured by the digital camera and also including associated image-capturing-condition information is stored in the image capturing apparatus 201 or the storage medium 202. The image capturing apparatus 201 or the storage medium 202 is connected to an interface (I/F) 109 serving as an interface of the image processing apparatus 101, and the image information D1 is transferred to the image memory 104 via the I/F 109. An image-capturing-condition information extraction unit 12 extracts the image-capturing-condition information and the image data from the image information D1 stored in the image memory 104. Based on the image-capturing-condition information extracted by the image-capturing-condition information extraction unit 12, a process setting unit 13 sets a process performed by a detection processing unit 14. In accordance with the setting made by the process setting unit 13, the detection processing unit 14 performs a detection process on the image data of the image information D1. A correction processing unit 15 performs a correction process depending on a result of the detection process performed by the detection processing unit 14 thereby generating image information D2. The resultant image information D2 is transmitted to a printer engine 105. The printer engine 105 produces an output by printing the image information D2 on a printing medium.

Image Processing Apparatus According to the First Embodiment

An outline of a process performed by the image processing apparatus according to the first embodiment is described below with reference to FIG. 2.

Figure 2:
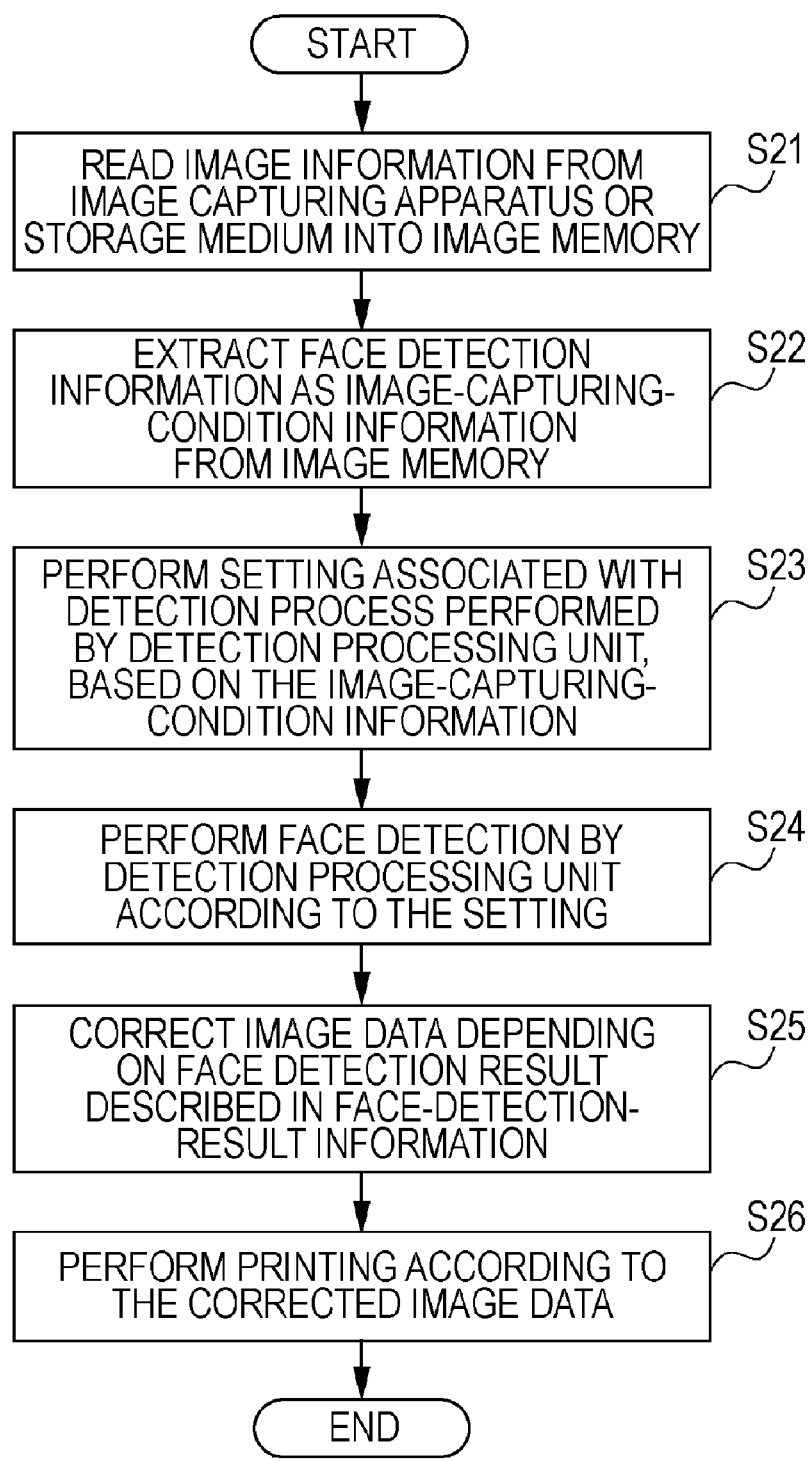
FIG. 2 is a flow chart illustrating an operation procedure performed by an image processing apparatus according to an embodiment of the present invention.

FIG. 2 is a flow chart illustrating an operation procedure performed by the image processing apparatus 101 according to the first embodiment. A program corresponding to the flow chart shown in FIG. 2 is stored in the ROM 103 or the RAM 104, and the program is read therefrom and executed by the CPU 102 thereby executing the process shown in the flow chart of FIG. 2.

First, in step S21, the image processing apparatus 101 accesses, via the I/F 109, the image capturing apparatus 201 or the memory card serving as the storage medium 202 and reads the image information D1 from the memory card into the image memory 104.

In the present example, it is assumed that the image capturing apparatus 201 or the storage medium 202 is the memory card in which image information D1 including image-capturing-condition information captured by the digital camera has been stored. It is also assumed that the image-capturing-condition information stored in the memory card includes information indicating the number of faces detected in the focal length adjustment process in an image capturing operation and also information indicating directions, sizes, and positions of the respective detected faces.

Next, in step S22, the image-capturing-condition information extraction unit 12 analyzes the image information D1 stored in the image memory 104 and extracts image-capturing-condition information indicating the number, directions, sizes, and positions of the detected faces.

Next, in step S23, based on the number, directions, sizes, and positions of the faces indicated by the extracted image-capturing-condition information, the process setting unit 13 performs setting associated with the face detection process to be performed by the detection processing unit 14. Note that in the present embodiment, the image-capturing-condition information is face detection information.

More specifically, in the setting associated with the face detection process to be performed by the detection processing unit 14, the direction, the size, and the position of the detector to be used in the face detection process are determined based on the number, directions, sizes, and positions of the faces described in the image-capturing-condition information. Note that the detector refers to a template used to detect the specific area by matching. Although it is assumed in the present embodiment that the specific area is a face area, the specific area may be other parts included in the image. For example, the specific area may be a total figure of a person, a building, a vehicle, etc.

Next, in step S24, the detection processing unit 14 performs the face detection process in accordance with the setting performed by the process setting unit 13.

Next, in step S25, the correction processing unit 15 corrects the image data of the image information D1 in a manner depending on the result of the face detection process, and the correction processing unit 15 outputs resultant corrected image information as image information D2.

Next, in step S26, the printer engine 105 performs printing on paper in accordance with the corrected image information D2 produced by the correction processing unit 15.

In the conventional techniques, the above-described process, which is performed in the present embodiment by the detection processing unit 14, is not performed but the result of the face detection performed by the image capturing apparatus 201 is directly used by the correction processing unit 15, or otherwise the correction processing unit 15 uses the result of the face detection performed by the detection processing unit 14 without using image-capturing-condition information stored in the image capturing apparatus 201 or the storage medium 202.

In the present embodiment, unlike the conventional techniques, based on the face-detection-result information described in the image-capturing-condition information stored in the image capturing apparatus 201 or the storage medium 202, the process setting unit 13 sets parameters such as the direction, size, or position of the detector used in the face detection performed by the detection processing unit 14 as necessary.

The process in the example described above includes the correction process on the input image information D1 and the printing process. However, in a case where only a face detection is necessary, the correction processing unit 15 and the printer engine 105 are not necessary.

Although the memory card is used as the storage medium 202 in the present embodiment, other types of storage media may be used.

The image capturing apparatus 201 may be, for example, a digital camera or a digital video camera. The image capturing apparatus 201 may be an apparatus having an image capturing unit and a connection unit whereby a captured image can be stored in a built-in memory in the apparatus or in a memory card connected to the apparatus, and the stored image can be transferred to an external apparatus via the connection unit using a serial cable or the like such as a USB cable.

The image capturing apparatus 201 does not necessarily need to have a storage unit such as a hard disk if the image capturing apparatus 201 has a built-in memory capable of storing image data including image-capturing-condition information and the stored image data can be transferred to an external apparatus via a serial cable or the like.

The storage medium 202 may be, for example, a memory card or a USB memory. The image capturing apparatus 201 does not necessarily need to have the storage medium 202 such as a memory card, if the image capturing apparatus 201 is configured such that image data including image data can be stored in a built-in memory and the image capturing apparatus 201 can be connected to an external apparatus.

The image information D1 is image data stored in a format such as Exif (Exchangeable image file format) that allows image-capturing-condition information to be described within an image file.

Note that there is no particular restriction on the data format or the storage format of the image information D1 as long as the image-capturing-condition information is allowed to be related to the image data.

That is, the image capturing apparatus 201 is an image capturing apparatus such as a digital camera and the storage medium 202 is a storage medium such as a memory card both configured to store image information D1 of a captured image including image-capturing-condition information.

Image Processing Unit According to the First Embodiment

The image processing unit 53 of the image processing apparatus 101 according to the present embodiment of the invention is described in detail below with reference to drawings.

As shown in FIG. 1, the image processing unit 53 includes an image-capturing-condition information extraction unit 12, a process setting unit 13, and a detection processing unit 14.

Image-Capturing-Condition Information Extraction Unit

The image-capturing-condition information extraction unit 12 is a processing unit configured to extract image-capturing-condition information from the image information D1 stored in the image memory 104.

Figure 3:
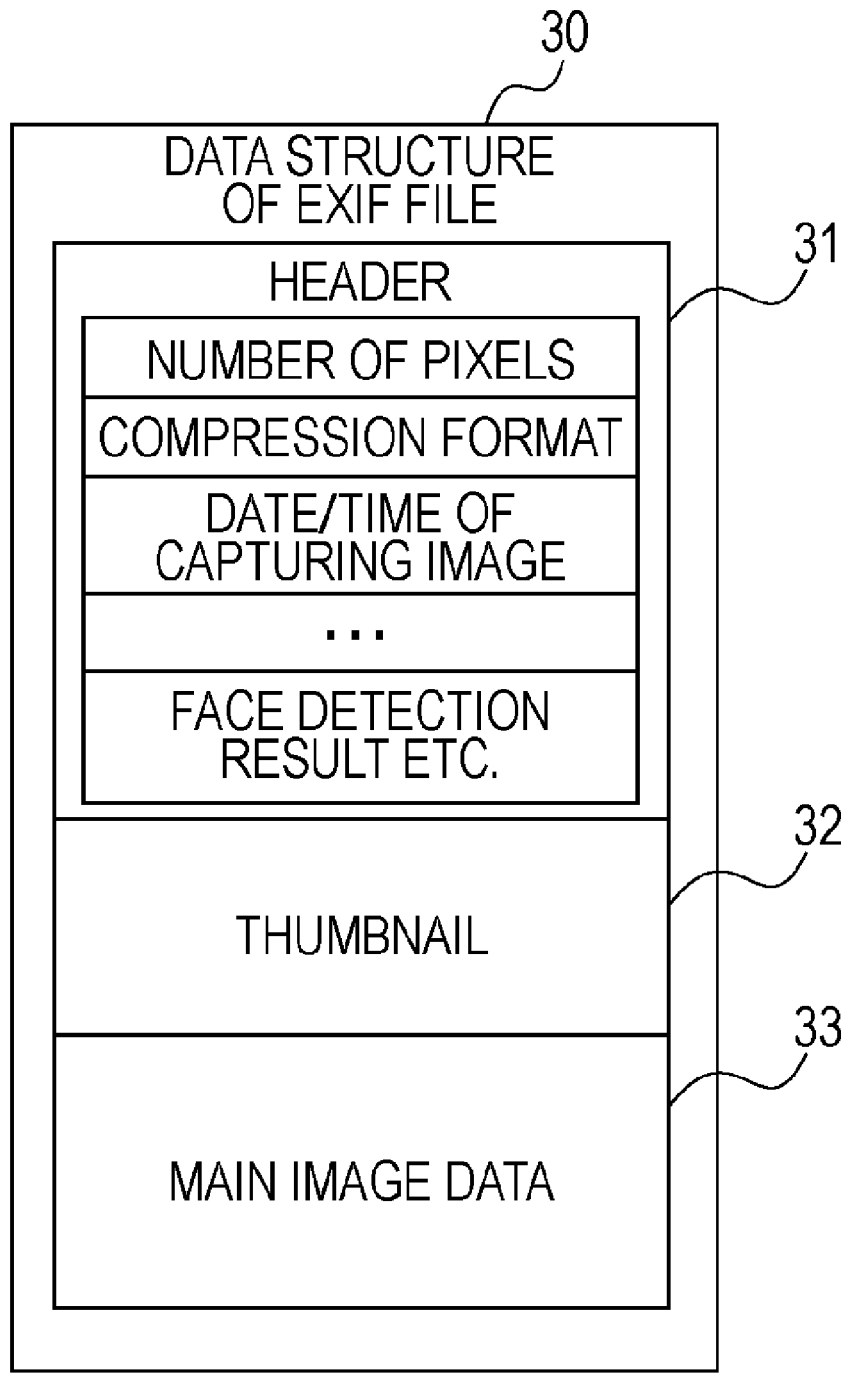
FIG. 3 is a diagram illustrating a data structure of an Exif file.

In the present embodiment, by way of example, it is assumed that the image information D1 is JPEG image data stored in the Exif format. FIG. 3 illustrates a data structure of an Exif file. Main parts of the data structure 30 of the Exif file are a header 31, a thumbnail 32, and main image data 33.

The main image data 33 is image data obtained by compressing captured image data in the JPEG (Joint Photographic Experts Group) format which is one of still image data compression formats.

The thumbnail 32 is image data obtained by converting the main image data 33 into a size of 160×120.

The header 31 includes image-capturing-condition information indicating conditions employed in the capturing of the main image. In the present embodiment, it is assumed that the image-capturing-condition information includes face-detection-result information indicating a result of a face detection performed in a focus adjustment process, in addition to information indicating the number of pixels, a compression format, date/time of capturing the image, etc. The face-detection-result information includes information indicating the number of detected faces, the direction and the size of each detected face, and the coordinate position in the captured image for each detected face.

The image-capturing-condition information extraction unit 12 checks the header information of the image information stored in the image memory 104 to determine whether the image information is stored in the Exif file format. If so, the image-capturing-condition information extraction unit 12 extracts the face-detection-result information described in the Exif header 31. The extracted face-detection-result information is sent to the process setting unit 13.

Process Setting Unit

The process setting unit 13 is a processing unit configured to perform setting associated with the detection process to be performed by the detection processing unit 14, based on the image-capturing-condition information extracted by the image-capturing-condition information extraction unit 12.

More specifically, when the detection processing unit 14 is set to perform the face detection process, the process setting unit 13 sets the direction of a template used in the face detection by the detection processing unit 14, based on the face direction indicated by the face-detection-result information extracted by the image-capturing-condition information extraction unit 12.

Figure 4:
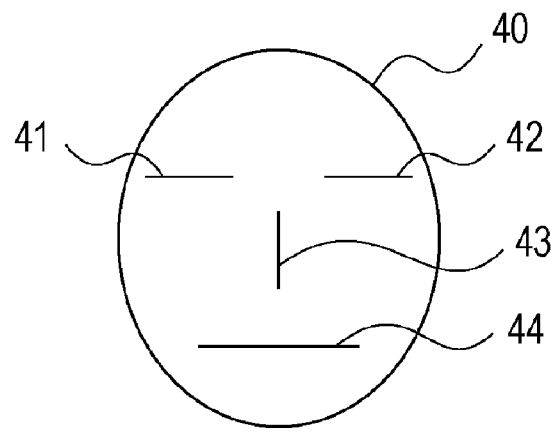
FIG. 4 is a diagram illustrating a concept of a detector for performing face detection.

FIG. 4 illustrates a concept of a detector (template) 40 used in the face detection. A face included in a captured image is detected by matching the captured image with the template 40. More specifically, the detector (template) 40 shown in FIG. 4 is configured to detect face elements such as a right eye 41, a left eye 42, a nose 43, and a mouth 44 of a face. The face detection is performed by checking whether the right eye 41, the left eye 42, the nose 43, and the mouth 44 of the detector 40 are all detected.

Figure 5:
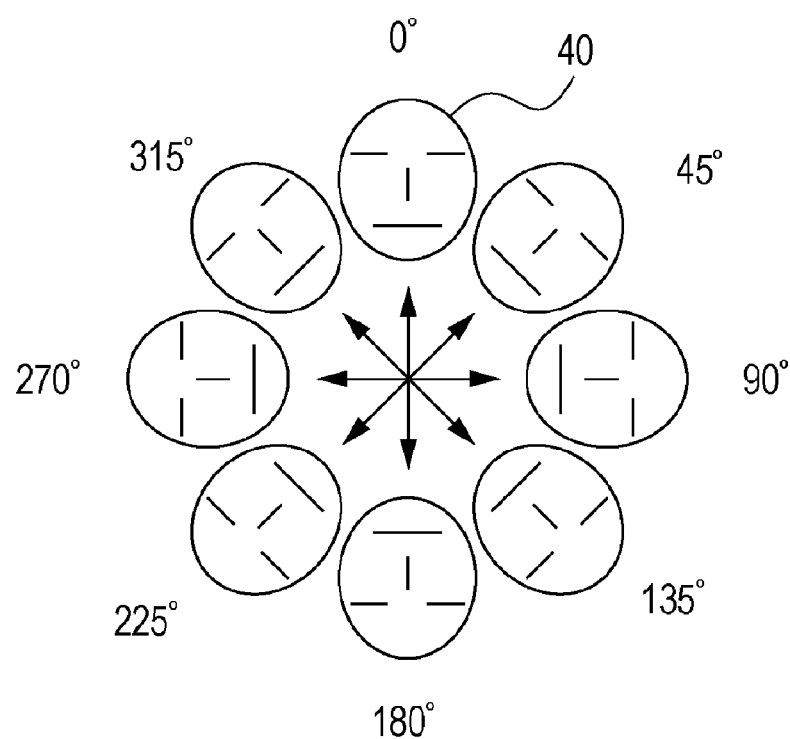
FIG. 5 is a diagram illustrating a concept of a face detection process in which a detector is used in eight directions.

FIG. 5 is a diagram illustrating a concept of a face detection process in which the detector shown in FIG. 4 is used for eight directions. In FIG. 5, the eight directions of the detector 40 are set at angles of 0°, 45°, 90°, 135°, 180°, 225°, 270°, and 315° where the reference direction of the detector is defined in an upward direction, and the angles are measured in a clockwise direction starting with 0° in the reference direction.

In the conventional face detection technique, no information is provided as to the direction of a face included in image data of the image information D1, and thus it is necessary to perform the template matching for various angles of the detector 40 as shown in FIG. 5. In contrast, in the present embodiment, the direction of the face as of the time when the image was captured is detected from the face-detection-result information extracted by the image-capturing-condition information extraction unit 12, and it is assumed that there is a high probability that a face in an input image is in a similar direction to that of the face included in the captured image.

For example, in a case where the image-capturing-condition information of the image information D1 includes information indicating that a face is detected in a direction of 0°, i.e., in the upward direction in the image data, it is expected that the face in the image data of the image information D1 is in a direction of about 0°.

Figure 6:
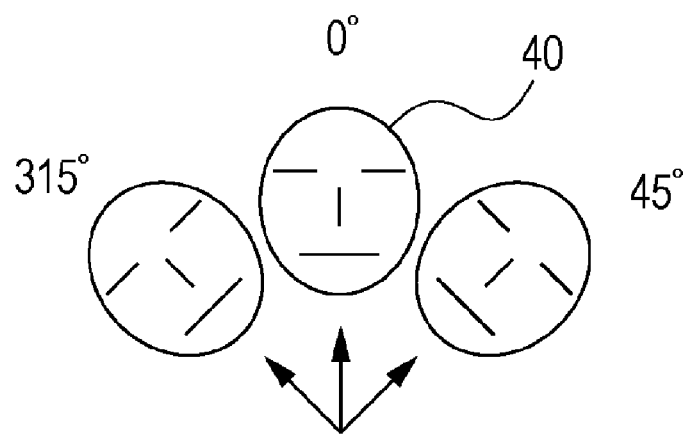
FIG. 6 is a diagram illustrating a concept of setting performed by a process setting unit in terms of directions of a detector employed in a face detection process performed by a detection processing unit.

In this case in which the face is expected to be in the direction of about 0°, the detection processing unit 14 detects the face by checking the matching of the detector (template) with the image data for angles of 0°, 45°, and 315° of the detector, in other words, by using three detectors. FIG. 6 is a diagram illustrating a concept of setting performed by the process setting unit 13 in terms of directions of the detector employed in the face detection process performed by the detection processing unit 14. In a case where the captured image includes a plurality of faces, the direction of the detector is set for each of the plurality of faces so that all faces can be detected by the image processing apparatus 101. For example, in a case where there is a face in a direction of about 0° and there is another face in a direction of about 180°, the detector 40 is set in six directions of 0°, 45°, 135°, 180°, 225°, and 315°, and the face detection process is performed for these six directions.

The face detection is performed, as described above, by detecting elements of the detector 40, i.e., the right eye 41, the left eye 42, the nose 43, and the mouth 44, and thus the detection process needs a long time to detect so many elements. In a case where in the face detection process, the detector is set in eight directions as shown in FIG. 5, the face detection needs a still longer processing time. In the present embodiment, to avoid the above problem, the directions in the face detection process are limited to three directions as shown in FIG. 6 thereby achieving a reduction in the processing time.

In the present embodiment, the directions of the detector used in the face detection process by the detection processing unit 14 are set based on the face directions described in the face-detection-result information. However, the parameter of the detector set by the detection processing unit 14 is not limited to the direction.

For example, the size of the detector used in the face detection process performed by the detection processing unit 14 is set based on a face size described in face-detection-result information.

Figure 7:
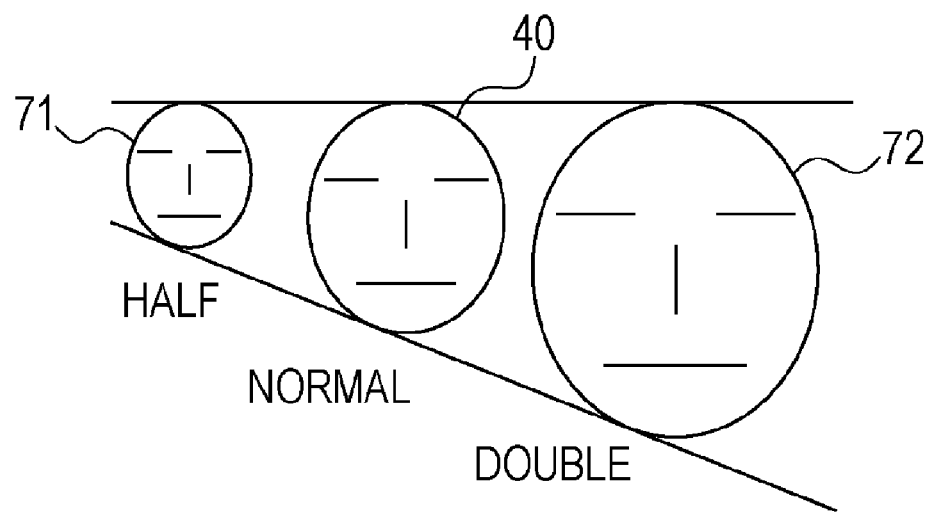
FIG. 7 is a diagram illustrating a concept of changing the size of a detector used in a face detection process.

FIG. 7 illustrates a concept of changing the size of the detector 40 used in the face detection process. In the example shown in FIG. 7, the detector 40 has a normal size, a detector 71 has a size one-half the normal size in both vertical and horizontal direction, and a detector 72 has a size twice the normal size in both vertical and horizontal directions.

In the face detection process according to the conventional technique, no information is provided as to the size of a face in image data of the image information D1, and thus it is necessary to use the detector 40 for various sizes as shown in FIG. 7. In the present embodiment, in contrast, information on the size of a face in a captured image is provided as a face-detection-result information extracted by the image-capturing-condition information extraction unit 12, and thus it is possible to expect that the size of a face in an input image is highly likely to be close to the size described in the face-detection-result information.

Thus, in the following explanation, by way of example, it is assumed that the image-capturing-condition information of the image information D1 includes information indicating that the size of the face in the image data is close to one-half the normal size of the detector 40. In this case, it is expected that the face in the image data of the image information D1 has a size close to one-half the normal size of the detector 40.

If the face size is predicted to be nearly equal to one-half the normal size of the detector 40, then the size of the detector used in the face detection process by the detection processing unit 14 is set to one-half the normal size of the detector 40, and only the resultant detector 71 set to this size is used in the face detection process.

As described above, the face detection is performed by detecting elements of the detector 40, i.e., the right eye 41, the left eye 42, the nose 43, and the mouth 44, and thus the detection process needs a long time to detect so many elements. In a case where in the face detection process, the detector is set to three sizes as shown in FIG. 7, the face detection needs a still longer processing time. In the present embodiment, to avoid the above problem, the size of the detector is limited to one size thereby achieving a reduction in the processing time.

In a case where the captured image includes a plurality of faces with different sizes, the detector is set to sizes corresponding to the respective sizes of the face so that all faces can be detected by the image processing apparatus 101. For example, in a case where the captured image includes two faces one of which has a size close to one-half the normal size of the detector 40 and the other one of which has a size close to twice the normal size of the detector 40, the face detection process is performed using two detectors, i.e., the detector 71 with the size one-half the normal size of the detector 40 and the detector 72 with the size twice the normal size of the detector 40.

Detection Processing Unit

The detection processing unit 14 is a processing unit configured to perform the detection process in accordance with the setting performed by the process setting unit 13.

The detection processing unit 14 performs the detection process such as the face detection process. The face detection process may be performed in various manners. In the present embodiment, the detector 40 for detecting the right eye 41, the left eye 42, the nose 43, and the mouth 44 is used, and a check is made for various angles and sizes of the detector 40 as to whether the right eye 41, the left eye 42, the nose 43, and the mouth 44 are detected in the image data of the image information D1.

For example, the process setting unit 13 may set the detection process such that the detection is performed for only three angles around 0°, i.e., 0°, 45°, and 315°, and for only one size, using the detector 71 shown in FIG. 7 having the size that is one-half the normal size of the detector 40. In this case, the image data of the image information D1 is subjected to the face detection process in which the detector 71 with the size one-half the normal size of the detector 40 is used and the captured image is compared with the detector 71 in three directions of 0°, i.e., 0°, 45°, and 315°.

In the conventional face detection technique, no information is provided as to the direction of a face in image data of the image information D1, and thus it is necessary to perform the detection process using three detectors having different sizes such as those shown in FIG. 7 in eight different directions such as those shown in FIG. 5. That is, in this case, it is necessary to perform the face direction process for a total of 24 detection conditions. In the present example, the detector 71 with the size one-half the normal size of the detector 40 is used, and the detection process is performed only in three directions of 0°, i.e., 0°, 45°, and 315°. Thus, the detection process is performed only for three detection conditions. The reduction in the number of processing conditions leads to a reduction in processing time.

The detection process performed by the detection processing unit 14 is similar to the detection process that is performed to produce the image-capturing-condition information stored in the image capturing apparatus 201 or the storage medium 202. There is no particular restriction on the details of the detection process as long as the parameters of the detection process performed by the detection processing unit 14 can be limited based on the image-capturing-condition information.

In the present embodiment, it is assumed that the image capturing apparatus 201 is a digital camera or the like and the image processing apparatus 101 is a printer or the like. The present embodiment is also applicable to a combination of a scanner and a printer. In this case, the scanner and the printer both have a detection processing unit configured to detect a specific area, and the printer performs a detection process based on information obtained as a result of a detection process performed by the scanner. The present embodiment is also applicable to a combination of a digital camera and a personal computer (PC) connected to the digital camera. In this case, the PC may perform a detection process based on information obtained as a result of a detection process performed by the digital camera. The present embodiment is also applicable to a combination of a PC (Personal Computer) and a printer connected to the PC. In this case, the printer may perform a detection process based on information obtained as a result of a detection process performed by the PC.

In the first embodiment, as described above, when the external apparatus and the image processing apparatus both have the capability of detecting a specific area, the image processing apparatus performs the process of detecting the specific area based on the information obtained as a result of the detection process performed by the external apparatus thereby allowing the image processing apparatus to have the improved performance and to perform the detection process in a shorter processing time.

Second Embodiment

An outline of a process performed by an image processing apparatus according to a second embodiment is described below.

In the first embodiment described above, when the image processing apparatus performs a detection process similar to that performed by the image capturing apparatus such as a digital camera, the detection result stored in the image capturing apparatus is used in the detection process performed by the image processing apparatus thereby achieving simplification of the process. However, in the first embodiment, there is a possibility that there is a specific area that cannot be detected by the image capturing apparatus, depending on the performance of the image capturing apparatus. In the detection process performed by the image processing apparatus, it is impossible to detect such a specific area that cannot be detected by the image capturing apparatus. This is because the specific area detected in the detection process by the image processing apparatus can be specified only by the detection result stored in the image capturing apparatus. That is, the angles or sizes of the template used in the detection process performed by the image capturing apparatus are limited to specific values, and thus a specific area with an angle or size different from the limited values cannot be detected by the image processing apparatus. In the second embodiment, the problem described above is handled.

In the second embodiment, the image processing apparatus 101 configured as shown in FIG. 1 is also used as in the first embodiment described above. However, the second embodiment is different from the first embodiment in that the processes performed by the process setting unit 13 and the detection processing unit 14 shown in FIG. 1 are different from those according to the first embodiment. In the following explanation of the second embodiment, a description of similar processes to those in the first embodiment is omitted.

The operation procedure performed by the image processing apparatus 101 is similar to that according to the first embodiment described above with reference to the flow chart shown in FIG. 2, and thus a duplicated explanation of the operation procedure is omitted.

Image Processing Unit According to Second Embodiment

The image processing unit 53 of the image processing apparatus according to the present embodiment of the invention is described in detail below with reference to drawings.

As shown in FIG. 1, the image processing unit 53 includes an image-capturing-condition information extraction unit 12, a process setting unit 13, and a detection processing unit 14. In the present embodiment, the image-capturing-condition information extraction unit 12 shown in FIG. 1 is similar to that according to the first embodiment, and thus a further description thereof is omitted, and the description is focused on the process performed by the process setting unit 13 and that performed by the detection processing unit 14.

Process Setting Unit

The process setting unit 13 is a processing unit configured to perform setting associated with the detection process to be performed by the detection processing unit 14, based on the image-capturing-condition information extracted by the image-capturing-condition information extraction unit 12.

In the following explanation, by way of example, it is assumed that the detection processing unit 14 performs the face detection process. Based on the face direction indicated in the face-detection-result information extracted by the image-capturing-condition information extraction unit 12, the process setting unit 13 sets the weight for the direction of the detector used in the face detection process performed by the detection processing unit 14.

In the face detection process according to the conventional technique, no information is provided as to the direction of a face included in image data of the image information D1, and thus it is necessary to use the detector 40 for various angles assigned the same weight, as shown in FIG. 5. In the present embodiment, in contrast, information on the direction of a face in a captured image is provided as a face-detection-result information extracted by the image-capturing-condition information extraction unit 12, and thus it is possible to expect that the direction of a face in an input image is highly likely to be close to the direction described in the face-detection-result information. Furthermore, as for faces that were not detected by the image capturing apparatus such as a digital camera, it is also expected that these undetected faces are also highly likely to be in the same direction as the direction of the detected face.

In this case in which the face is expected to be in the direction of about 0°, a high weight is assigned to angles around the angle of 0°, i.e., 0°, 45°, and 315° for the detector used in the face detection process performed by the detection processing unit 14. On the other hand, a lower weight is assigned to other angles, i.e., 90°, 135°, 180°, 225°, and 270°.

In the face detection, as described above, if the detector used in the face detection is set to eight directions as shown in FIG. 5, the weight is set to be equal for all directions in some of which there may be no face. This leads to an increase in probability of making an erroneous detection. In the present embodiment, in view of the above, the weights of the detectors used by the detection processing unit 14 are changed depending on the face direction indicated in the face-detection-result information extracted by the image-capturing-condition information extraction unit 12 thereby reducing the probability of making an erroneous detection.

In the example described above, the detection processing unit 14 sets the weights of the directions of the detector used in the face detection process performed by the detection processing unit 14, based on the face directions described in the face-detection-result information. However, the parameter of the detector for which the weight is set by the detection processing unit 14 is not limited to the direction.

For example, based on a face size described in face-detection-result information, the weight may be defined for the size of the detector used in the face detection performed by the detection processing unit 14.

In the conventional techniques, no information is provided as to the size of a face in image data of the image information D1, and thus it is necessary to use the detector 40 for various sizes such as those shown in FIG. 7 assigned the same weight. In the present embodiment, in contrast, information on the size of a face in a captured image is provided as a face-detection-result information extracted by the image-capturing-condition information extraction unit 12, and thus it is possible to expect that the size of a face in an input image is highly likely to be close to the size described in the face-detection-result information.

Thus, in the following explanation, by way of example, it is assumed that the image-capturing-condition information of the image information D1 includes information indicating that the size of the face in the image data is close to one-half the normal size of the detector 40. In this case, it is expected that the face in the image data of the image information D1 actually has a size close to one-half the normal size of the detector 40.

If the face size is predicted to be nearly equal to one-half the normal size of the detector 40, and thus the weight is assigned to the detector used by the detection processing unit 14 such that the detector 71 with the size one-half the normal size of the detector 40 has a high weight but other detectors have a lower weight.

In the face detection process, as described above, if the same weight is assigned to three sizes shown in FIG. 7 of the detectors used in the face detection process, then even sizes that are very different from the actual face size have the same weight. This leads to an increase in probability of making an erroneous detection. In the present embodiment, in view of the above, the weights of the detectors are changed depending on the face size indicated in the face-detection-result information extracted by the image-capturing-condition information extraction unit 12 thereby reducing the probability of making an erroneous detection.

Detection Processing Unit

The detection processing unit 14 is a processing unit configured to perform the detection process in accordance with the setting performed by the process setting unit 13.

In the following explanation, by way of example, it is assumed that the detection processing unit 14 performs the face detection process. The face detection process may be performed in various manners. In the present embodiment, the detector (template) 40 for detecting the right eye 41, the left eye 42, the nose 43, and the mouth 44 is used, and the determination is made as to whether the right eye 41, the left eye 42, the nose 43, and the mouth 44 are detected in the image data of the of the image information D1.

For example, the process setting unit 13 may set the detection process such that a high weight is assigned to angles around the angle of 0°, i.e., 0°, 45°, and 315° for the detector shown in FIG. 5 while a lower weight is assigned to other angles, i.e., 90°, 135°, 180°, 225°, and 270°, and furthermore the weights of the sizes of the detectors shown in FIG. 7 may be set such that the detector 71 with the size one-half the normal size of the detector 40 has a high weight while other detectors have a lower weight.

The face detection process is performed for all angles of the template, i.e., 0°, 45°, 90°, 135°, 180°, 225°, 270°, and 315°. A threshold value is set for the matching level in the face detection process, and the threshold value is changed depending on the weight. For example, for angles with weights greater than a first predetermined value, the threshold value is set to be smaller than a second predetermined value, while the threshold value is set to be greater than the second predetermined value for angles with weights smaller than the first predetermined value. This results in a reduction in probability of detecting a face in an image corresponding to a template with an angle having a low weight. The reduction in probability of detecting such a face leads to a reduction in the number of faces to be subjected to the correction process performed by the correction processing unit, which leads to a reduction in processing load, which are advantages obtained. As described above, the threshold value used in the face detection process is set for each angle of the template.

As for the sizes, the threshold value is set to be small for sizes with high weights, while the threshold value is set to be large for sizes with low weights.

In the face detection process performed by the detection processing unit 14, the detector 40 is used to detect face elements such as the right eye 41, the left eye 42, the nose 43, and the mouth 44. In the detection of the face elements, matching scores may be defined. For example, a score of 100 is given to the matching of each of the right eye 41 and the left eye 42, 50 to the nose 43, and 70 to the mouth 44. Furthermore, the total matching score of the detector 40 is given such that the matching is evaluated for each element, the matching score is given for a detected element, and the total matching score is given by the sum of scores for the respective detected elements. A threshold value is set for the total matching score. For example, when the threshold value is set to 250, if the total matching score is greater than this threshold value, then it is determined that a face is detected.

For example, if the right eye 41, the left eye 42, the nose 43, and the mouth 44 are all detected in a particular area, then the total matching score of the detector 40 for this area is given as 100+100+50+70=320. In this case, the total matching score is greater than the threshold value, i.e., 250, and thus it is determined that a face is detected. On the other hand, in a case where the right eye 41, the nose 43, and the mouth 44 are detected in a particular area, the total matching score is given as 100+50+70=220. In this case, the matching score is smaller than the threshold value, i.e., 250, and thus it is determined that there is no face in this specific area.

In the conventional face detection technique, no information is provided as to the direction and the size of a face in image data of the image information D1. Therefore, in the face detection process, the same weight is given to even those directions in which there is no face or even to those sizes that are very different from the actual size. This leads to an increase in probability of making an erroneous detection. In the present embodiment, in contrast, the weight is set to the detection process performed by the detection processing unit 14 based on the detection result described in the image-capturing-condition information thereby achieving a reduction in the probability of making an erroneous detection.

In the first embodiment, in the case where there is a specific area that cannot be detected by the image capturing apparatus such as a digital camera due to the performance of the image capturing apparatus, the specific area cannot be detected by the image processing apparatus.

In the second embodiment, the weight for the detection process performed by the detection processing unit 14 is set by the process setting unit 13 based on the extracted image-capturing-condition information, and the detection process is performed for the entire area of the image data of the image information D1 thereby making it possible to detect even the specific area undetectable by the image capturing apparatus and achieving a reduction in probability of making an erroneous detection.

In the second embodiment, as described above, when the external apparatus and the image processing apparatus both have the capability of detecting a specific area, the weight for the angle or the size of the template used in the detection process performed by the image processing apparatus is set based on the extracted image-capturing-condition information thereby making it possible to detect even the specific area undetectable by the image capturing apparatus and thus achieving an improvement in detection performance.

Third Embodiment

The present invention may be applied to a system including a plurality of devices (such as a host computer, an interface device, a reader, a printer, etc.) or may be applied to an apparatus including only a single device (such as a copy machine, a facsimile machine, etc.).

One or more of functions according to one of or a mixture of the embodiments described above may be implemented by loading a software program code from a medium onto a computer (or a CPU or an MPU) of a system or an apparatus, and executing the program on the computer. In this case, the program code read from a computer-readable storage medium implements the novel functions disclosed in the embodiments described above, and the storage medium on which the program code is stored falls within the scope of the present invention. Specific examples of storage media for supplying the program code include a floppy (registered trademark) disk, a hard disk, an optical disk, a magneto-optical disk, a DVD-ROM disk, a DVD-ROM disk, a DVD-R disk, a CD-ROM disk, a CD-R disk, a magnetic tape, and a nonvolatile memory card.

The functions disclosed in the embodiments may be implemented not only by executing the program code on a computer, but part or all of the process may be performed by an operating system or the like running on the computer in accordance with the program code. Such implementation of the functions also falls within the scope of the present invention.

The program code may be read from a storage medium and loaded into a function extension board inserted in a computer or into a function extension unit connected to the computer thereby realizing one or more functions according to any embodiment of the invention described above. In this case, more specifically, the program code read from the storage medium is written in a memory disposed on the function extension board or the function extension unit. and a CPU or the like disposed in the function extension board or the function extension unit may perform part or all of the process according to the loaded program code thereby achieving one or more functions according to any embodiment of the invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-162301 filed Jun. 20, 2008, which is hereby incorporated by reference herein in its entirety.

What is claimed is:

1. An image processing apparatus comprising:
an input unit configured to input, from an external apparatus, image data and image-capturing-condition information obtained by an image capturing operation;
a determining unit configured to determine an angle or a size of a template used in detecting a specific area from the image data, based on the image-capturing-condition information input via the input unit; and
a detection unit configured to detect a specific area from the image data by comparing the image data with the template having the angle or the size determined by the determining unit,
wherein the external apparatus and the image processing apparatus are both configured to detect the specific area, analyze the image data,
wherein the image processing apparatus receives the image-capturing-condition information as a result of a first detection process that has already been performed by the external process, and
wherein the image processing apparatus performs a second detection process based on the image-capturing-condition information derived from the first detection process.

2. The image processing apparatus according to claim 1, wherein:
the image-capturing-condition information is face detection information obtained by an image capturing operation; and the specific area is a face area.

3. The image processing apparatus according to claim 2, wherein the face detection information is information indicating a face direction or a face size.

4. The image processing apparatus according to claim 1, wherein:
the determining unit determines, based on the image-capturing-condition information, a weight for each angle of the template used in detecting the specific area; and
the detection unit sets, based on the weight, a threshold value for detecting the specific area for angle of the template, and the detection unit compares the specific area included in the image data with the template corresponding to an angle of the specific area to detect the specific area by determining whether a matching degree in the comparison is greater than the threshold value.

5. The image processing apparatus according to claim 4, wherein when the weight is greater than a first predetermined value, the threshold value is set to be smaller than a second predetermined value, while the threshold value is set to be greater than the second predetermined value when the weight is smaller than the first predetermined value.

6. The image processing apparatus according to claim 4, wherein when the matching degree in the comparison is greater than the threshold value, the specific area is detected.

7. An image processing method performed in an image processing apparatus, the method comprising the steps of:
inputting, from an external apparatus, image data and image-capturing-condition information obtained by an image capturing operation;
determining an angle or a size of a template used in detecting a specific area from the image data, based on the image-capturing-condition information input in the inputting step; and
detecting a specific area by comparing the image data with the template having the angle or the size determined in the determining step,
wherein the external apparatus and the image processing apparatus are both configured to detect the specific area,
wherein the image processing apparatus receives the image-capturing-condition information as a result of a first detection process that has already been performed by the external process, and
wherein the image processing apparatus performs a second detection process based on the image-capturing-condition information derived from the first detection process.

8. The image processing apparatus according to claim 7, wherein:
the image-capturing-condition information is face detection information obtained by an image capturing operation; and
the specific area is a face area.

9. A control program storable in non-transitory a storage medium readable by a computer, the control problem being adapted to make the computer execute an image processing method, the image processing method executed by the computer comprising the steps of:
inputting, from an external apparatus, image data and image-capturing-condition information obtained by an image capturing operation;
determining an angle or a size of a template used in detecting a specific area from the image data, based on the image-capturing-condition information input in the inputting step; and
detecting a specific area from the image data by comparing the image data with the template having the angle or the size determined in the determining step,
wherein the external apparatus and the image processing apparatus are both configured to detect the specific area,
wherein the image processing apparatus receives the image-capturing-condition information as a result of a first detection process that has already been performed by the external process, and
wherein the image processing apparatus performs a second detection process based on the image-capturing-condition information derived from the first detection process.

10. An image processing apparatus comprising:
an input unit configured to input, from an external apparatus, image data and image-capturing-condition information obtained by an image capturing operation;
a determining unit configured to determine an angle or a size of a template used in detecting a specific area from the image data, based on the image-capturing-condition information input via the input unit; and
a detection unit configured to detect a specific area from the image data by comparing the image data with the template having the angle or the size determined by the determining unit
wherein the determining unit determines, based on the image-capturing-condition information, a weight for each angle of the template used in detecting the specific area; and
the detection unit sets, based on the weight, a threshold value for detecting the specific area for angle of the template, and the detection unit compares the specific area included in the image data with the template corresponding to an angle of the specific area to detect the specific area by determining whether a matching degree in the comparison is greater than the threshold value.

11. The image processing apparatus according to claim 10, wherein when the weight is greater than a first predetermined value, the threshold value is set to be smaller than a second predetermined value, while the threshold value is set to be greater than the second predetermined value when the weight is smaller than the first predetermined value.

12. The image processing apparatus according to claim 10, wherein when the matching degree in the comparison is greater than the threshold value, the specific area is detected.

13. An image processing method performed between an external apparatus and an image processing apparatus, wherein the external apparatus and the image processing apparatus are both configured to detect a specific area from an image, analyze image data, and derive image-capturing-condition information, the method comprising the steps of:

performing a first detection process in the external apparatus and deriving image-capturing-condition information by analyzing the image data;

inputting into the image processing apparatus, from the external apparatus, the image data and image-capturing-condition information obtained by an image operation in the external process via the first detection process;

determining in the image processing apparatus an angle or a size of a template used in detecting a specific area from the image data, based on the image-capturing-condition information input in the inputting step; and performing a second detection process in the image processing apparatus by detecting a specific area and comparing the image data with the template having the angle or the size determined in the determining step, wherein the image processing apparatus performs the second detection process based on the image-capturing-condition derived from the first detection process.

* * * * *